Jan. 17, 1967   F. H. STITES   3,299,271
ELECTRO-OPTICAL LABEL READING SYSTEM USING PULSE
WIDTH DETECTION CIRCUIT
Filed Dec. 18, 1963
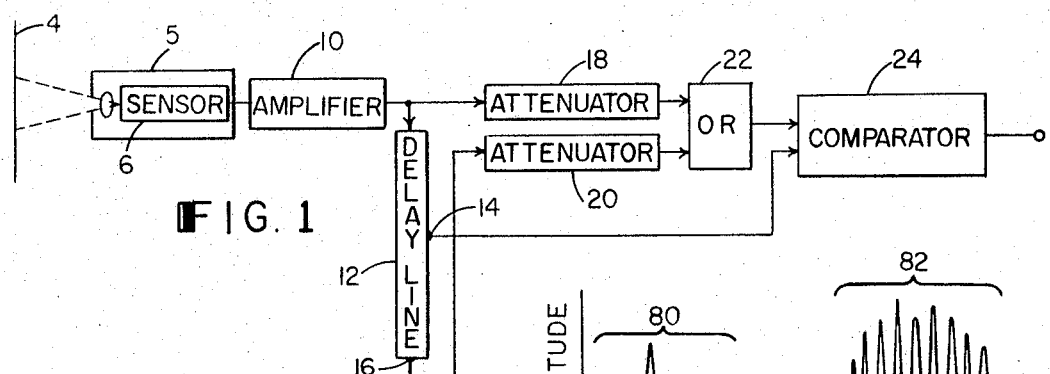
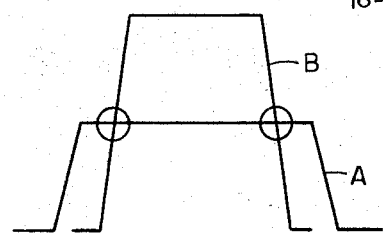
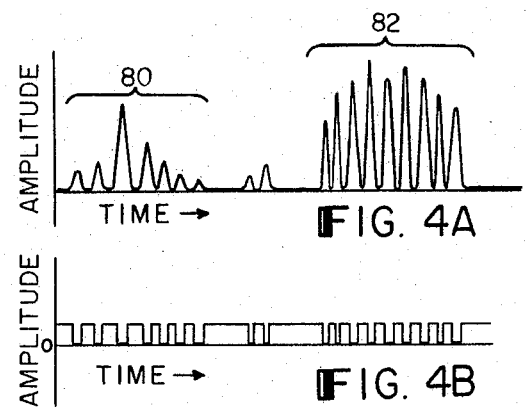
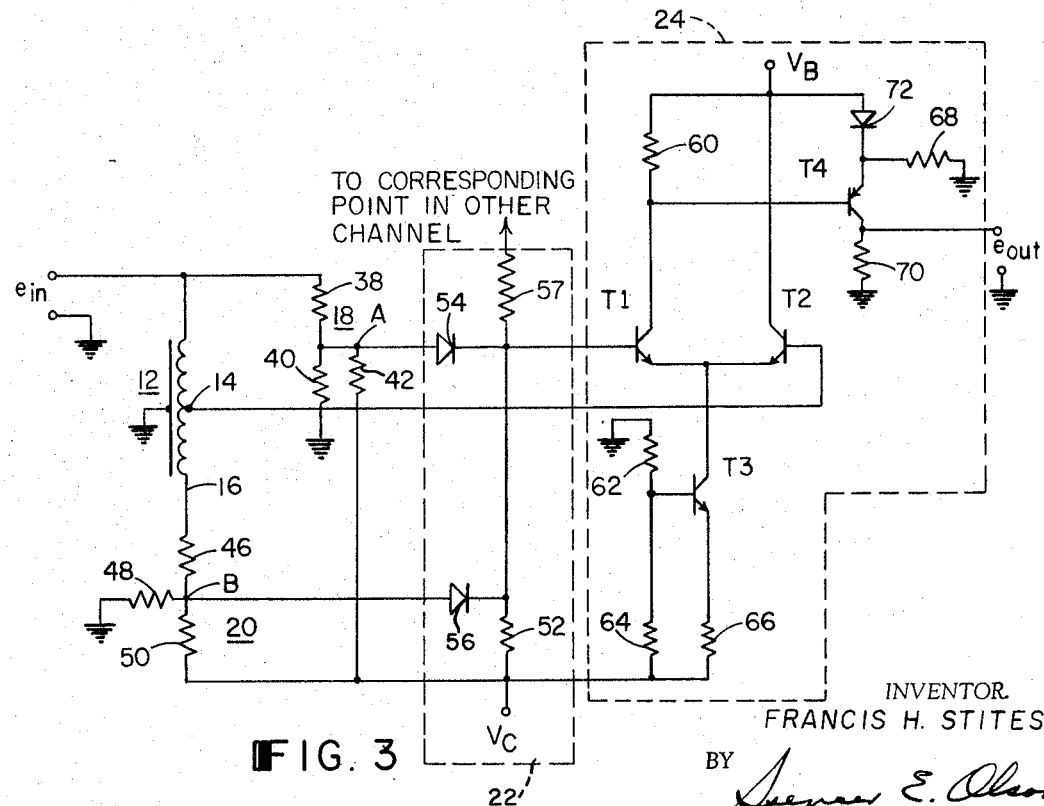
INVENTOR.
FRANCIS H. STITES
BY
*Spencer E. Olson*
ATTORNEY.

United States Patent Office 3,299,271
Patented Jan. 17, 1967

3,299,271
ELECTRO-OPTICAL LABEL READING SYSTEM USING PULSE WIDTH DETECTION CIRCUIT
Francis H. Stites, Wayland, Mass., assignor to Sylvania Electric Products Inc., a corporation of Delaware
Filed Dec. 18, 1963, Ser. No. 331,990
7 Claims. (Cl. 250—219)

This invention relates to electronic circuitry and more particularly to pulse width detection circuits for accurately measuring the width of pulses having widely varying amplitudes, rise times and wave shapes.

In systems involving the remote acquisition of data, it is necessary to convert the analog information received by the sensing device to standardized data for processing or analysis, and the success of such systems is highly dependent on the accuracy of the conversion. A system whose effectiveness depends heavily on the accuracy of pulse width measurement is the electro-optical mark sensing system for identifying railroad cars, or other vehicles, described in co-pending application S.N. 137,918, filed September 13, 1961, now Patent No. 3,225,177 and assigned to the assignee of the present application. The system of the aforesaid application, which will be described here only to the extent required for an understanding of the present invention, includes a trackside unit for reading a coded label affixed to the side of the vehicle to be identified, and for translating the coded information in the label into vehicle identification numbers of other data. The labels are fabricated from colored stripes of retro-reflective material which reflects substantially all of an incident light beam back along the path of incidence. The labels are suitably coded, for example in a two position base four code, by various two-stripe combinations of orange, blue, white and black stripes to represent start and stop control words and the decimal digits one through zero, and are mounted in a vertical succession of horizontally oriented stripes on the side of the vehicle.

The trackside reading unit includes a source of light and a rotating drum having a plurality of mirrors mounted around its periphery. As the drum rotates, the mirrors cause a beam of light to vertically scan the label, the light reflected from the label being divided by a dichroic optical system into orange and blue "channels" for application to respective sensors, the output signals from which are decoded to provide an output signal corresponding to the information on the labels.

In practice, the amplitude of the returned optical signals may vary over at least a 100:1 range in an unpredictable fashion, and the rise time of the pulses may vary widely as the result of varying distances between the label and the optical system due to vibration or swaying of the vehicle as it passes the reader, changes in optical focusing, irregularities or damage to the label itself due to weathering or dirt, or misalignment between the label and the optical equipment. In the subsequent processing of the pulses to determine whether they were caused by an orange, a blue, or a white stripe, it is necessary to sample each pulse substantially at the midpoint of its width, the sampling gate being derived from the leading edge of each pulse. In order accurately to perform this closely timed operation, while taking into account the disturbing factors just discussed, it is necessary precisely to determine the width of each of the signal pulses, width here being defined as the dimension of an individual bit of data in the direction of scan. Inasmuch as the distance between half-amplitude points on the leading and trailing edges of a pulse has been found to be independent of rise time or amplitude of the pulse it has been found convenient to determine the pulse width at mid-amplitude and in response thereto produce an output pulse of corresponding width and standardized amplitude.

The processing of data in this system is further complicated by the fact that the signal amplitude does not return to zero between closely spaced pieces of data, or because successive pulses overlap to give a pulse having two peaks of unequal amplitude. As noted earlier the coded digits are represented by two-stripe combinations of retro-reflective material, some of which include a combination of white with either blue or orange. In either of these cases, the white stripe reflects a higher intensity beam than either the blue or orange, because of its greater reflectivity, with the consequence that the amplitude of that portion due to the white stripe is greater than the amplitude of the portion of the signal due to the colored stripe. Consequently, the total signal representing the two-stripe combination appears as a double-peak pulse, with the "white" portion being of higher amplitude. The width of the major peak of such pulses can easily be misread as the width of the entire pulse, thereby introducing an error in the reading of that particular digit. High levels of background illumination also prevent the signal from returning to zero between bits of information. In the label each two-stripe combination of colored stripes is separated from the next adjacent combination by a black stripe which ideally does not reflect a significant amount of light back to the reader. However, under conditions of high ambient illumination, or dirt of a particular kind on the black stripe, signals of amplitude greater than those from a colored stripe which must be accepted by the system are frequently caused by reflection from the black stripes, and unless suppressed so as not to generate a standarized output pulse cause errors in decoding of the label. Thus, it is necessary to maintain the sensitivity at a level between data bits which will prevent weak unwanted signals that may occur between the data bits from producing output pulses while still permitting full sensitivity when all of the data is of low amplitude.

With an appreciation of the problems attendant the processing and decoding of data in remote acquisition systems, applicant has as a primary object of the present invention to provide practical circuitry for measuring the width of pulses having widely varying amplitudes, rise times and wave shapes.

A more specific object of the invention is to provide circuitry for generating in response to data bit pulses of varying amplitude and rise times standardized pulses of uniform amplitude and having widths corresponding to the width of their respective data bit pulses.

Briefly, in accordance with the invention the width of a pulse is measured at its mid-amplitude because the distance between mid-amplitude points on the leading and trailinging edges of the pulse does not change with variations in amplitude or rise time of the pulse. The mid-amplitude point is determined by comparing a delayed version of the signal pulse with a stretched half-amplitude version of the signal pulse and deriving an output pulse in response to the first crossing the second. In a preferred embodiment, the signal pulse is stretched and reduced to half-amplitude by the coaction of a delay line, a pair of attenuators and an OR circuit to establish a threshold level for a comparator circuit, and the full-amplitude signal pulse, delayed by approximately half the amount that the signal pulse was stretched, is compared with this threshold level. The comparator is operative in response to the delayed full-amplitude signal crossing the threshold level to produce an output pulse of arbitrary amplitude and of a width equal to the mid-amplitude width of the input signal pulse. By reason of the existence of the threshold level for a period longer than the signal pulse, and present for a period both before and after occurrence of the delayed signal pulse, low amplitude signals which may occur immediately before and immediately after the signal pulse are ineffective to produce output pulses from the comparator.

Other objects, features and advantages of the invention, and a better understanding of its construction and operation, will become apparent from the following detailed description, taken in conjunction with the accompanying drawing, in which:

FIG. 1 is a block diagram of a preferred embodiment of the invention;

FIG. 2 is an idealized plot of pulse waveforms useful to an understanding of the operation of the invention;

FIG. 3 is a schematic circuit diagram illustrating a preferred implementation of the block diagram of FIG. 1; and FIGS. 4A and 4B are respectively pulse waveforms before and after operation of the circuit of FIG. 3.

Referring to FIG. 1, in the system described in the aforementioned co-pending application, an information label 4 is attached to the side of railroad car or other vehicle to be identified in a position so as to be scanned in a vertical direction by a beam of light from a trackside unit. The label consists of a vertical array of horizontally oriented stripes of retro-reflective material, arranged according to a code and representing an identifying number for the vehicle. The trackside unit includes a reader 5 arranged to be sensitive at any instant of time to a small area of the label. The received light is split by a dichroic optical system (not shown in FIG. 1) into two channels, only one of which is illustrated. Each channel includes a sensor 6, such as a photomultiplier which converts the light signals incident thereon to electrical signals. These signals, a train of pulses of varying amplitude and pulse shape, are amplified in a suitable amplifier 10 prior to application to the pulse width measuring circuit of the present invention. The pulses produced by the sensor normally "ride" on a slowly varying base line introduced by variation in background illumination. To facilitate measurement of the width of the pulses and further processing of the signals, the amplifier 10 preferably includes a D.C. restoration circuit for effectively removing the base line component. An eminently suitable circuit for this purpose is disclosed in co-pending application S.N. 329,805 filed December 11, 1963 and assigned to the assignee of the present application.

The present pulse width measuring circuit comprises a delay line 12 having a first output tap 14 at its center and a second output tap 16 at its far end, the delay at tap 16 being twice that at the center tap, a pair of attenuators 18 and 20 designed to reduce by half the amplitude of the respective signals applied thereto, an OR circuit 22, and a comparator circuit 24. Signals from the label reader, after suitable amplification and elimination of the aforementioned baseline component, are applied in parallel to the input terminal of delay line 12 and through attenuator 18 to one input terminal of OR circuit 22. The delayed version of the input signal appearing at output tap 16 is applied through a second attenuator 20 to the second input terminal of the OR circuit. As is well known, an OR circuit produces an output signal when a signal is applied to either of its input terminals. Accordingly, the output of OR circuit 22 is a pulse of half the amplitude of the input signal, because of attenuation by attenuators 18 and 20, and which is wider than the input of signal by the amount of the time delay of delay line 12. The resulting stretched half-amplitude pulse is shown in idealized form as pulse A in FIG. 2. This signal is applied to one of the input terminals of comparator 24, and the signal appearing at center tap 14 of the delay line is applied, without attenuation to the second input terminal of the comparator. For best operation, the total time delay of delay 12 should be approximately equal to the longest expected rise time so that the pulse from OR circuit 22 reaches its full amplitude before the pulse from center tap 14 reaches its half-amplitude. In practice, a total time delay of approximately 20 microseconds has been found satisfactory. With the indicated delay time of 20 microseconds, the signal at tap 14 starts 10 microseconds after the start of the stretched pulse and terminates 10 microseconds before the end of the stretched pulse, as indicated by pulse B in FIG. 2.

Comparator 24 determines the difference between the signal from OR circuit 22 and the delayed pulse from center tap 14 and produces a pulse whose width is determined by the circled cross-over points in FIG. 2, which occurs at the mid-point width of the signal pulse B regardless of its amplitude. This is accomplished by setting a threshold level in comparator 24 by the signal from OR circuit 22, which, it will be remembered, is half the amplitude of the input signal. Thus, the signal pulse from center tap 14 triggers the comparator when its leading and trailing edges pass the threshold level. The output of the comparator is a rectangular pulse, clipped near the level of the threshold, and having a width determined by the points at which the leading and trailing edges of the signal pulses pass the threshold. Since the threshold is determined by the half-amplitude level of the input signal, the comparator output pulse has a width equal to the midpoint width of the input signal pulse.

The fact that the signal at tap 14 starts 10 microseconds (typically) after the leading edge of the stretched pulse A (FIG. 2) and ends 10 microseconds before the trailing edge of the stretched pulse affords what may be termed "guard bands" which prevent small amplitude signals occurring in the 10 microsecond periods preceding and following the signal pulse B from producing an output from comparator 24. Such signals as might occur during these periods would primarily be due to reflections from black stripes in the label separating two-stripe combinations of colored stripes. The black stripes are employed to achieve a clear demarcation between successive data bits; this feature of the circuit enhances the effectiveness of the black stripe by suppressing or "excluding" from consideration signals which may from time to time be reflected from them.

Referring now to FIG. 3, which is a circuit diagram of a preferred implementation of the block diagram of FIG. 1, the input signal from amplifier 10 (FIG. 1) is applied in parallel to the input terminal of delay line 12 and to an attenuator 18 consisting of resistors 38 and 40 connected in series between the input terminal of delay line 12 and ground and resistor 42 connected from the junction of resistors 38 and 40 to a source of potential negative with respect to ground, represented by a terminal labelled $V_C$. The output terminal 16 of the delay line is connected to another attenuator 20 consisting of resistors 46 and 48 connected in series between terminal 16 and ground and resistor 50 connected from their junction to the source of negative potential. Resistors 42 and 50 together with resistor 52, one terminal of which is connected to the source of negative potential $V_C$, serve to bias diodes 54 and 56 so as to be just conducting in the absence of an input signal. Diode 54 is poled to couple signals from attenuator 18 to the base electrode of a transistor T1, and diode 56 is arranged to couple signals from attenuator 20 to the base electrode of transistor T1. Thus, diodes 54 and 56 provide the "OR" function described in connection with FIG. 1, causing a signal to appear at the base of transistor T1 during conduction of either or both of diodes 54 and 56. In the comparator circuit, within dotted enclosure 24, transistor T1 is interconnected with another transistor T2 as a difference amplifier. The collector electrode of transistor T1 is connected through load resistor 60 to a source of positive potential, represented by terminal $V_B$, and the collector of transistor T2 is directly connected to this source of positive potential. The emitter electrodes of transistors T1 and T2 are connected together and to the collector electrode of transistor T3, the emitter of which is connected through resistor 66 to the source of negative potential $V_C$. The base electrode of transistor T3 is connected to a point on the voltage divider consisting of resistors 62 and 64 connected between ground and the source of negative potential. Transistor T3 and its associated circuitry functions as a constant current source for transistors T1 and T2. The center tap of delay line 12 is directly connected to the base electrode of transistor T2. An output pulse is derived from the comparator circuit by a high speed gate circuit including transistor T4. The collector of this transistor, from which the output signal is derived, is connected to ground through resistor 70, and the emitter is connected through resistor 68 to ground and through diode 72 to the source of positive potential. The collector of transistor T1 is directly connected to the base electrode of transistor T4.

In operation, the input signal from amplifier 10 is attenuated to one-half its initial amplitude by attenuator 18 and applied via diode 54 to the base electrode of transistor T1. The input signal is also applied to the input terminal of delay line 12, the delayed signal appearing at output terminal 16 also being attenuated to one-half of its initial amplitude by attenuator 20 and applied through diode 56 to the base of transistor T1. Consequently, the combined signal appearing at the base of transistor T1 is a pulse having half the amplitude as the input pulse and a duration greater than the input pulse by an amount equal to the delay introduced by delay line 12. This half-amplitude signal on the base electrode of transistor T1 sets the threshold of the comparator to establish pulse width measurement at the mid-amplitude point of the pulse. The delayed, but full amplitude, input pulse derived from the center tap 14 of the delay line is applied to the base of transistor T2, and since this pulse starts after the start of the original input pulse and is delayed by only half the amount that the pulse applied to transistor T1 is delayed, the full amplitude delayed pulse falls within the duration of the threshold pulse.

The comparator circuit operates as follows to accomplish pulse width measurement: In the quiescent state, transistors T1, T3 and T4 are on, and transistor T2 is non-conducting. When a signal is applied to the base of transistor T1, it is driven more conducting, but the output voltage $e_{out}$ does not change appreciably because of the clamping action of diode 72 and the base-emitter junction of transistor T4. Transistor T2 is turned on by the applicaton to its base electrode of the full amplitude delayed pulse from the center tap of the delay line, transistors T1 and T4 being biased so as to be switched off when the leading edge of this pulse crosses the threshold level determined by the signal applied to the base of transistor T1. When this crossover occurs, the output voltage $e_{out}$ drops sharply to ground. When the trailing edge of the pulse applied to the base of transistor T2 crosses the threshold level, the reverse occurs with transistors T1 and T4 switching on thereby causing the output voltage $e_{out}$ to rapidly return to the quiescent level. The output pulse thus produced has a width equal to the mid-amplitude width of the original signal pulse and a uniform amplitude, both factors facilitating the subsequent processing of the coded pulse signals.

It has been found advantageous in practice to set the threshold level of the comparator slightly above the half-amplitude level of the signal pulses to give better accuracy in the presence of smaller amplitude signals. That is, the resistors in the attenuator networks 18 and 20 of FIG. 3 are selected to cause the voltages at points A and B to be slightly greater than half the signal voltage at the center tap 14 of the delay line. Such adjustment is necessary because diodes 54 and 56 are not ideal devices, but rather act as variable resistors, particularly in the presence of small signals; accordingly, the signals are further attenuated by the diode resistance. However, by adjusting the threshold level slightly above the theoretically desirable level, the small signal attenuation of the diodes compensates for the threshold offset and the level actually established at the base electrode of transistor T1 is of the correct value. For large input signals, the operation of the diodes more nearly approaches the ideal, but the slight threshold offset does not materially affect the performance of the comparator circuit.

It has been noted earlier that in the system described in co-pending application S.N. 137,918, now Patent No. 3,225,177, the light received by the reader is split by a dichloric optical system into two channels in accordance with the color content of the light. That is, light from a blue stripe is directed to a "blue" channel, light from an orange stripe goes to the "orange" channel, and white light is directed to both. Under some circumstances, however, ambient conditions may cause signals to appear in the "orange" channel during a period of time that a blue stripe is being read which ideally would produce a signal pulse only in the "blue" channel. Unless the extraneous signals in the "orange" channel are suppressed, they may actuate the pulse width measuring circuitry in that channel and produce an erroneous output pulse which would interfere with subsequent decoding of the pulse information. It is usually more practical in this and other analog systems to make relative rather than absolute measurements of pulse amplitude to achieve discrimination of the kind presented by this situation; it is a significant feature of the circuit of FIG. 3 that it can be cross-connected with the corresponding circuit in the other channel in a simple manner to effect cross-correlation of the signals being processed in the two channels. The connection consists merely of a resistor 57 connected from the base electrode of transistor T1 in one channel to the same point in the comparator circuit in the other channel. This resistor has a value relative to resistor 52 (and the corresponding resistor in the other channel) to establish the desired division between the threshold voltages present in the two channels. Thus, in effect, the amplitude of the signal in one channel (which determines the threshold level) controls the threshold in the other channel. By way of example, the value of resistor 57 might be chosen such that signals in one channel less than ⅓ as great as signals in the other channel are "thrown" out while signals in said one channel greater than ⅓ those in the other (which would occur when a "white" signal is read) would be processed.

The circuit of FIG. 3 has been satisfactorily operated using the following component values:

| | | |
|---|---|---|
| Resistor 46 | ohms | 1,000 |
| Resistors 48, 50 | do | 2,000 |
| Resistors 38, 62 | do | 1,100 |
| Resistors 40, 42 | do | 1,800 |
| Resistor 52 | do | 100,000 |
| Resitsor 60 | do | 5,100 |
| Resistor 64 | do | 470 |
| Resistor 66 | do | 1,500 |
| Resistors 68, 70 | do | 10,000 |
| Transistors T1, T2, T3 | | 2N1959 |
| Transistor T4 | | 2N1991 |
| Diodes 54, 56 | | 1N277 |
| Diode 72 | | 1N2071 |

With operating voltages $V_B$ and $V_C$ of +12 volts and −12 volts, respectively, and a quiescent level of −6 volts for the input signal, the circuit has been found to operate satisfactorily over a dynamic range of 100:1 or more. By way of example, input signals varying from 0.1 to 11 volts have been processed without significant distortion.

The performance of circuit of FIG. 3 is graphically illustrated in the curves of FIGS. 4A and 4B which are respectively replicas of the pulse train from amplifier 10 (FIG. 1) and the train of pulses derived from the collector of transistor T4 in FIG. 3. It will be noted that the signal pulses depicted in FIG. 4A vary widely in amplitude and rise time, the pulses in the group designated 80 being on the average of lower amplitude than those in the group designated 82. The first group of pulses are characteristic of signals produced by reflection of light from a weathered or dirty label, while the larger, more uniform pulses 82 are typical of signals produced by reflection from a clean, unweathered label. The variations in rise time of the pulses are caused by a variety of factors including misalignment of the label relative to the optical system, vibration of the vehicle as it passes the reader, or changes in focusing of the optical system.

As shown in FIG. 4B, the circuit of FIG. 3 produces, for each input pulse, a rectangular output pulse of uniform amplitude with a clear separation between adjacent pulses. The width of each pulse corresponds to the mid-amplitude width of the pulse from which it is derived, regardless of the rise time or shape of the input pulse. These "clean" pulses of regular shape and uniform amplitude facilitate subsequent signal processing and decoding of the label information.

From the foregoing it is apparent that applicant has provided a circuit for measuring the true width of pulses of widely varying rise time and amplitude and for producing output pulses of uniform amplitude for facilitating further signal processing. While a preferred embodiment has been illustrated and described, various changes and alternative implementations will now occur to those skilled in the art without departing from the true spirit and scope of the invention. For example, electron tubes may be preferred to transistors in some applications, and indeed, it is convenient in an electron tube implementation of the inventive concept to establish half-amplitude threshold level by providing half the gain in the portion of the comparator to which the stretched pulse is applied as in the portion to which the delayed signal pulse is applied, thereby eliminating the requirement for attenuators 18 and 20. Accordingly, it is applicant's intention that the invention not be limited to that which has been particularly shown and described, except as such limitations appear in the appended claims.

What is claimed is:

1. A circuit for producing an output pulse of predetermined amplitude and a width equal to the mid-amplitude width of an input pulse, said circuit comprising, in combination, means operative in response to the application thereto of said input pulse to produce a first pulse the leading edge of which is coincident in time with the leading edge of said input pulse and having a duration exceeding that of said input pulse and to produce a second pulse having the same duration and amplitude as said input pulse and delayed in time relative to the leading edge of said first pulse by an amount such that said second pulse occurs during the period of said first pulse, a comparator having first and second input terminals and an output terminal, means coupling said first and second pulses to the first and second input terminals of said comparator, respectively, means operative in response to said first pulse to establish a threshold level in said comparator corresponding to the mid-amplitude of said input pulse, and an output circuit coupled to said comparator and operative in response to the leading and trailing edges of said second pulse crossing said threshold level to produce an output pulse of predetermined amplitude and a width equal to the mid-amplitude width of an input pulse.

2. A circuit for producing an output pulse of duration equal to the mid-amplitude width of an input pulse, said circuit comprising, in combination, a delay line having an input terminal and first and second output taps, the delay between said input terminal and said second tap being approximately twice the delay to said first output tap, a comparator circuit having first and second input terminals and an output terminal, means connected to the input terminal and second output tap of said delay line and to the first input terminal of said comparator and operative in response to an input pulse applied to the input terminal of said delay line to produce a pulse at the first input terminal of said comparator having half the amplitude of said input pulse and a duration greater than the duration of said input pulse by the amount of delay between the input terminal and second output tap of said delay line, means connecting the first output tap of said delay line to the second input terminal of said comparator and operative in response to an input pulse applied to the input terminal of said delay line to couple to the second input terminal the input pulse delayed with respect to the leading edge of the pulse applied to said first input terminal by the amount of delay between the input terminal and said first output tap of said delay line, and an output circuit connected to said comparator, said circuit being operative to produce in said output circuit a pulse of predetermined amplitude and of a duration equal to the mid-amplitude width of an input pulse.

3. In an electro-optical label reading system including a label containing coded data, apparatus for optically scanning the label, and a sensor operative in response to light reflected from said label to produce input signal pulses representative of said coded data, a circuit for producing an output pulse having a width equal to the mid-amplitude width of an input signal pulse, said circuit comprising: means for delaying said input signal pulse by a first amount and a second greater amount to produce successive delayed pulses, means for attenuating said input signal pulse and the pulse delayed by said greater amount to half the amplitude of said input signal pulse, means operative in response to said attenuated pulses to produce a resultant pulse which is wider than said input signal pulse by said greater amount of delay, and means operative in response to said resultant pulse and to a pulse delayed by said first amount to produce an output pulse having a width equal to the mid-amplitude width of said input signal pulse.

4. In an electro-optical label reading system including a label containing coded data, apparatus for optically scanning said label, and a sensor operative in response to light reflected from said label to produce input signal pulses representative of said coded data, a pulse width detector comprising: a delay line having an input terminal, a first output tap and a second output tap at which the delay is twice the delay at said first output tap, means for applying input signal pulses to the input terminal of said delay line, a first attenuator to which said signal pulses are also applied and operative to produce output pulses equal to half the amplitude of said input signal pulses, a second attenuator connected to said second output tap and operative to produce output pulses equal to half the amplitude of the pulse appearing at said second output tap, a comparator having first and second input terminals and an output terminal, means coupling the output pulses from said attenuators to the first input terminal of said comparator, and means connecting the first output tap of said delay line to the second input terminal of said comparator.

5. In an electro-optical label reading system including a label containing coded data, apparatus for optically scanning said label, and a sensor operative in response to light reflected from said label to produce signal pulses of varying amplitude and wave shape representative of said coded data, a circuit for standardizing said signal pulses comprising: a delay line having an input terminal, a first output tap and a second output tap at which the delay is twice the delay at said first output tap and the delay time between said input terminal and said second output tap is equal to the maximum rise time of said signal pulses, means for applying said signal pulses to the input terminal of said delay line, a first attenuator to which said signal pulses are also applied and operative to reduce by half the amplitude of said applied signal pulses, a second attenuator connected to the second output tap of said delay line and operative to reduce by half the amplitude of pulses appearing at said second output tap, an OR circuit having first and second input terminals and an output terminal, the attenuated signal pulses from said first and second attenuators being respectively applied to the first and second input terminals of said OR circuit, and a comparator having first and second input terminals and an output terminal means connecting the output terminal of said OR circuit to the first input terminal of said comparator, and means connecting the first output tap of said delay line to the second input terminal of said comparator.

6. In an electro-optical label reading system including a label containing coded data, apparatus for optically scanning said label, and a sensor operative in response to light reflected from said label to produce signal pulses of varying amplitude and wave shape representative of said coded data, a circuit for measuring the mid-amplitude width of said signal pulses comprising: a delay line having an input terminal and first and second output taps, the delay between said input terminal and said second output tap being twice the delay to said first output tap and approximately equal to the maximum rise time of said signal pulses, means coupling said signal pulses to the input terminal of said delay line, first means to which said signal pulses are also applied for attenuating by half the amplitude of said input signal pulses, second means coupled to the second output tap of said delay line for attenuating by half the amplitude of delayed signal pulses appearing thereat, a difference amplifier having first and second input terminals, means coupling said attenuated signals from said first and second means to the first input terminal of said difference amplifier, means coupling the delayed signal pulses appearing at the first output tap of said delay line to the second input terminal of said difference amplifier, and means coupled to said difference amplifier and operative in response to the simultaneous application to said first and said input terminals, respectively, of said difference amplifier of said attenuated pulse signals and a signal from the first output tap of said delay line to produce rectangular pulses of uniform amplitude.

7. In an electro-optical label reading system including a label containing coded data, apparatus for optically scanning said label, and a sensor operative in response to light reflected from said label to produce input signal pulses representative of said coded data, a circuit for measuring the mid-amplitude width of an input signal pulse comprising: a delay line having an input terminal and first and second output taps, the delay between said input terminal and said second output tap being twice the delay to said first output tap and approximately equal to the maximum rise time of said signal pulses, means for coupling input signal pulses to the input terminal of said delay line, a first attenuator to which said input signal pulses are also applied for reducing by half the amplitude of said input signal pulses, a second attenuator coupled to the second output tap of said delay line and operative to reduce by half the amplitude of the delayed signal pulses appearing thereat, first, second and third transistors each having base, emitter, and collector electrodes, means directly connecting the emitter of said first transistor to the emitter electrode of said second transistor, a first diode collected between said first attenuator and the base electrode of said first transistor, a second diode connected between said second attenuator and the base electrode of said first transistor, means directly connecting the first output tap of said delay line to the base electrode of said second transistor, a constant current source connected to the emitter electrodes of said first and second transistors, means directly connecting the collector electrode of said first transistor to the base electrode of said third transistor, means also connecting the collector of said first transistor through a load resistor and a third diode to the emitter electrode of said third transistor, and means connected to the collector electrode of said third transistor for deriving an output pulse therefrom.

References Cited by the Examiner

UNITED STATES PATENTS

| | | | |
|---|---|---|---|
| 3,086,121 | 3/1963 | Cockrell | 250—219 |
| 3,125,691 | 3/1964 | Astheimer | 307—88.5 |
| 3,171,964 | 3/1965 | Terlet | 250—209 |
| 3,249,895 | 3/1966 | Corney | 308—88.5 X |

RALPH G. NILSON, *Primary Examiner.*

WALTER STOLWEIN, *Examiner.*